US008508065B1

(12) United States Patent
Lee

(10) Patent No.: US 8,508,065 B1
(45) Date of Patent: Aug. 13, 2013

(54) WINDMILL GENERATOR SYSTEM

(76) Inventor: Chu B. Lee, Los Angeles, CA (US)

( * ) Notice: Subject to any disclaimer, the term of this patent is extended or adjusted under 35 U.S.C. 154(b) by 468 days.

(21) Appl. No.: 12/953,906

(22) Filed: Nov. 24, 2010

(51) Int. Cl.
F03D 3/04 (2006.01)

(52) U.S. Cl.
USPC .............................. 290/55; 290/54; 415/4.4

(58) Field of Classification Search
USPC ............. 290/43, 44, 54, 55; 415/4.4; 416/17
See application file for complete search history.

(56) References Cited

U.S. PATENT DOCUMENTS

| | | | |
|---|---|---|---|
| 4,015,911 A | | 4/1977 | Darvishian |
| 4,048,947 A | * | 9/1977 | Sicard ............................... 440/8 |
| 4,113,408 A | * | 9/1978 | Wurtz et al. .................... 416/17 |
| 4,191,507 A | * | 3/1980 | DeBerg ......................... 416/117 |
| 4,319,141 A | | 3/1982 | Schmugge |
| 4,551,631 A | * | 11/1985 | Trigilio ........................... 290/55 |
| 5,131,805 A | * | 7/1992 | Stevenson ........................ 415/1 |
| 5,256,034 A | * | 10/1993 | Sultzbaugh .................... 416/91 |
| 6,191,496 B1 | * | 2/2001 | Elder .............................. 290/55 |
| 6,726,439 B2 | | 4/2004 | Mikhail et al. |
| 6,734,576 B2 | * | 5/2004 | Pacheco ......................... 290/55 |
| 6,857,846 B2 | * | 2/2005 | Miller ........................... 415/4.2 |
| 6,926,491 B2 | * | 8/2005 | Migler ........................... 415/4.4 |
| D511,495 S | | 11/2005 | Okubo et al. |
| 7,323,791 B2 | | 1/2008 | Jonsson |
| 7,396,207 B2 | | 7/2008 | DeLong |
| 7,471,006 B2 | * | 12/2008 | Janca et al. ..................... 290/43 |
| 7,581,926 B1 | | 9/2009 | Dehlsen et al. |
| 7,633,177 B2 | * | 12/2009 | Platt ............................... 290/54 |
| 8,016,544 B1 | * | 9/2011 | Nguyen ......................... 415/60 |

* cited by examiner

Primary Examiner — Nicholas Ponomarenko

(57) ABSTRACT

A windmill generator system featuring a base with a generator, a shaft extending upwardly from the base, and a rotor housing rotatably attached atop the shaft. The shaft is operatively connected to the generator via a clutch system. The rotor housing is adapted to spin in a first direction and a second direction about the shaft, wherein rotation of the rotor housing generates energy for the generator. At least two flanges extend outwardly from the rotor housing. A wing is disposed on each flange. The wings extend outwardly a distance away from the rotor housing to harness wind. Each wing comprises a series of adjustable louvers.

8 Claims, 4 Drawing Sheets

WINDMILL GENERATOR SYSTEM

FIELD OF THE INVENTION

The present invention is directed to a windmill system, more particularly to a windmill system that harnesses energy for consumers.

BACKGROUND OF THE INVENTION

With the high cost of standard electricity and gas, many individuals look for alternative means of obtaining energy. The present invention features a novel windmill generator system that harnesses wind energy and converts it to usable energy for consumers. The windmill generator system of the present invention is environmentally friendly, efficient, and easy to use.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a windmill generator system. In some embodiments, the system comprises a base that houses a generator; a shaft extending upwardly from a top surface of the base, the shaft is operatively connected to the generator via a clutch system; a rotor housing rotatably attached atop the shaft, the rotor housing is adapted to spin in a first direction and a second direction about the shaft, wherein rotation of the rotor housing generates energy for the generator; a first flange extending outwardly from a first side edge of the rotor housing, and a second flange extending outwardly from a second side edge of the rotor housing; and a first wing disposed on the first flange and a second wing disposed on the second flange, each wing extends outwardly a distance away from the rotor housing to harness wind, each wing comprises a series of adjustable louvers.

In some embodiments, the rotor housing is constructed in a rectangular, circular, hexagonal, or pentagonal shape. In some embodiments, the system further comprises a third flange extending outwardly from a third side edge of the rotor housing. In some embodiments, the system further comprises a fourth flange extending outwardly from a fourth side edge of the rotor housing. In some embodiments, the system further comprises a third wing disposed on the third flange. In some embodiments, the system further comprises a fourth wing disposed on the fourth flange. In some embodiments, the wings are expandable in size. In some embodiments, the system comprises a first generator, a second generator, a third generator, a fourth generator, and a fifth generator each operatively connected to the shaft via the clutch system.

DESCRIPTION OF PREFERRED EMBODIMENTS

Figure 1:
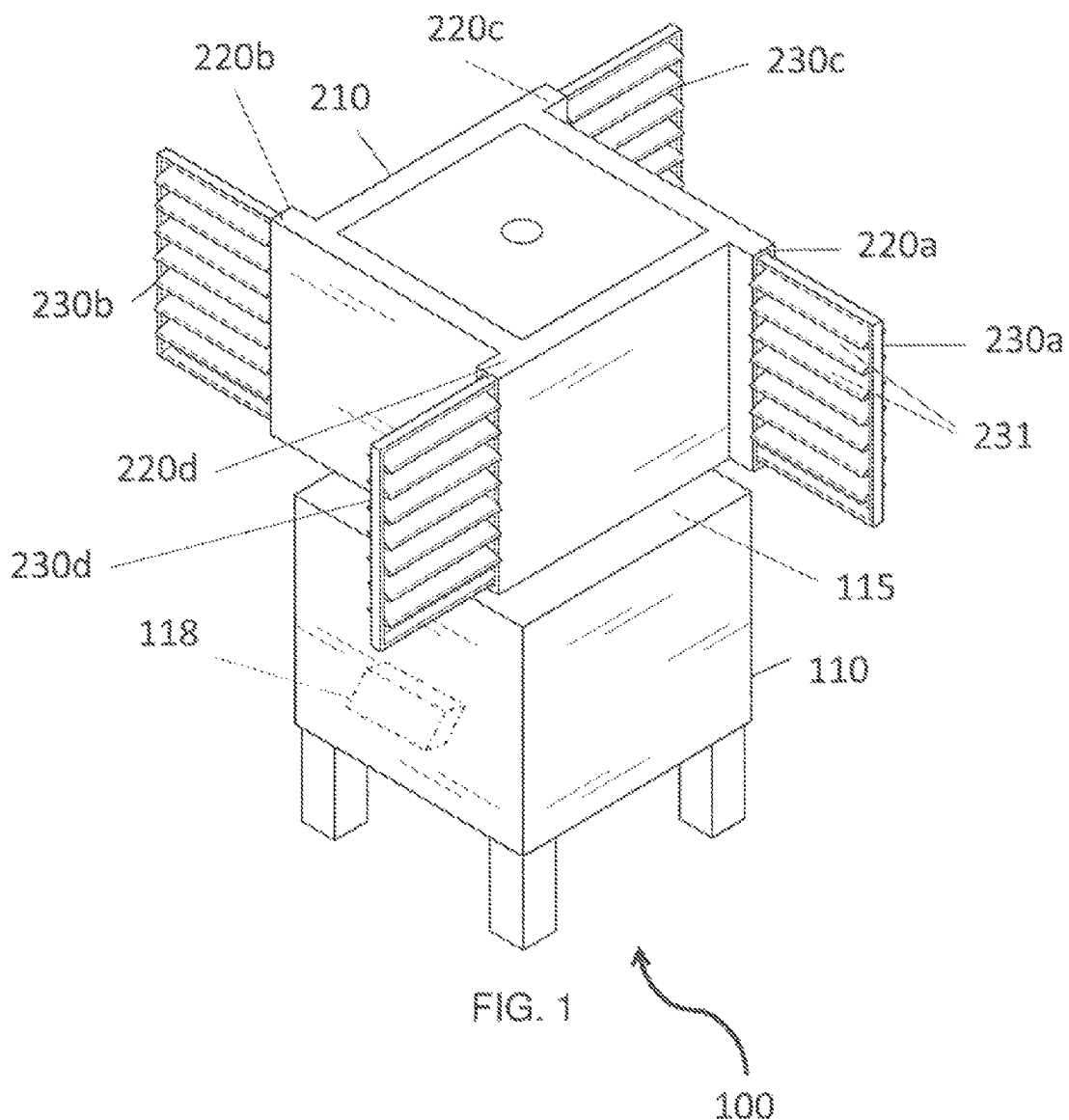
FIG. 1 is a perspective view of the windmill generator system of the present invention.
Figure 2:
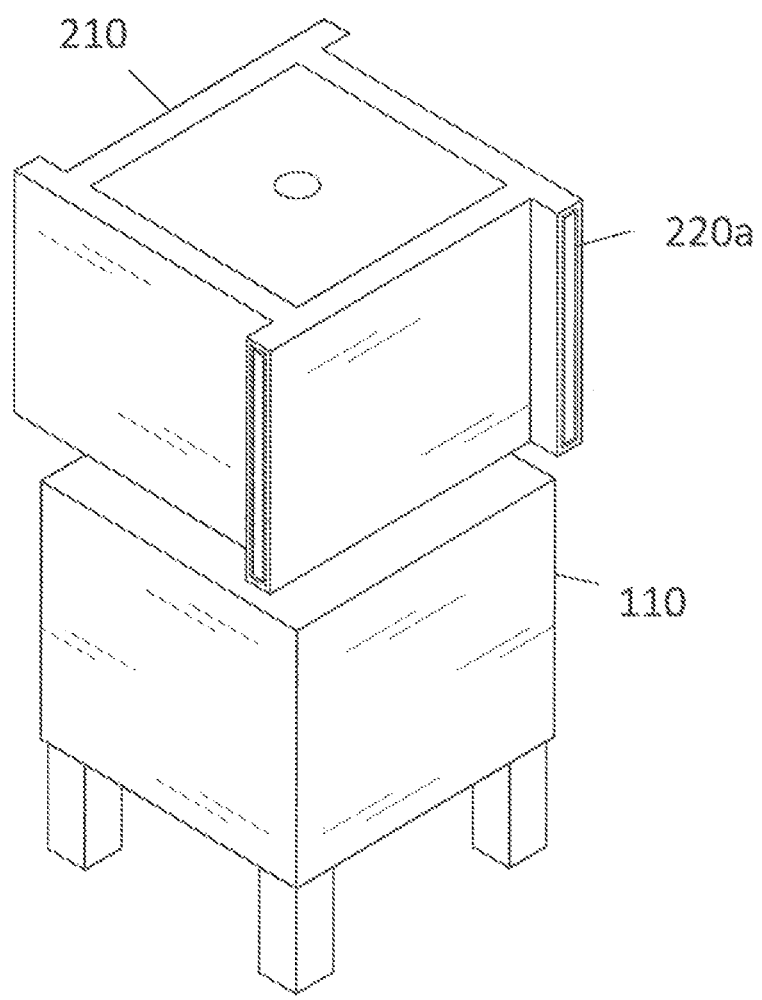
FIG. 2 is a perspective view of the windmill generator system of the present invention.
Figure 3:
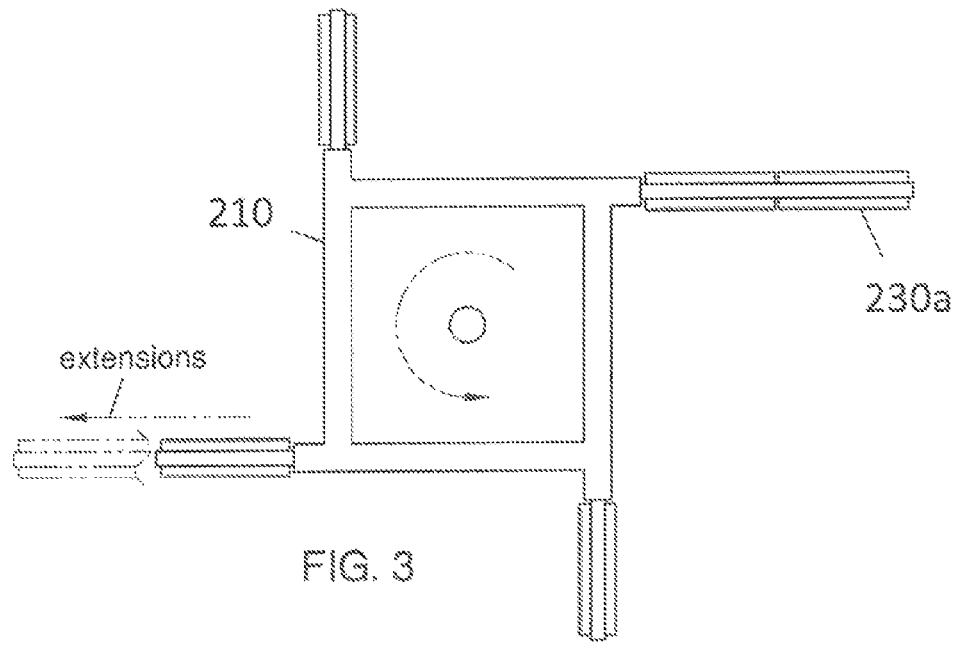
FIG. 3 is a top view of the windmill generator system of FIG. 1.
Figure 4:
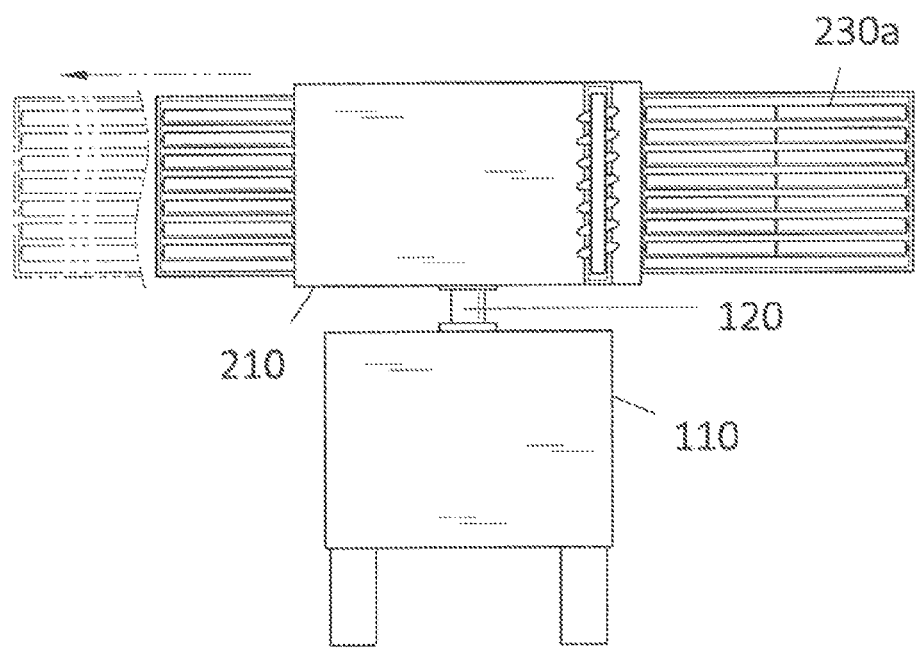
FIG. 4 is a side view of the windmill generator system of FIG. 1.

Referring now to FIG. 1-5, the present invention features a windmill generator system 100. The generator system 100 comprises a base 110 that houses a standard generator 118. In some embodiments, the base 110 is raised a distance above a ground surface, for example via legs or wheels disposed on the bottom surface of the base 110.

A shaft 120 extends upwardly from the top surface 115 of the base 110. The shaft is operatively connected to the generator 118 inside the base 110 (e.g., via a clutch system). Rotatably attached atop the shaft 120 is a rotor housing 210. The rotor housing 210 may be constructed in a variety of shapes including but not limited to rectangular (e.g., FIG. 1), circular (e.g., FIG. 5), hexagonal, pentagonal, etc. The present invention is not limited to the aforementioned shapes. The rotor housing 210 is adapted to spin in a first direction and a second direction about the shaft 120. Rotation of the rotor housing 210 generates energy for the generator 118.

Extending outwardly from at least two side edges of the rotor housing 210 is a flange 220. For example, a first flange 220*a* extends outwardly from a first side edge of the rotor housing 210 and a second flange 220*b* extends outwardly from a second side edge of the rotor housing 210. In some embodiments, a third flange 220*c* extends outwardly from a third side edge of the rotor housing 210. In some embodiments, a fourth flange 220*a* extends outwardly from a fourth side edge of the rotor housing 210. In some embodiments, the rotor housing 210 comprises more than four flanges 220.

Disposed on the first flange 220*a* is a first wing 230*a*. Disposed on the second flange 220*b* is a second wing 230*b*. Disposed on the third flange 220*c* is a third wing 230*c*. Disposed on the fourth flange 220*d* is a fourth wing 230*d*. The wings 230 extend outwardly a distance away from the rotor housing 210 to help harness wind. The wings 230 may be expandable in size (e.g., see FIG. 3, FIG. 4). In some embodiments, the wings 230 fit into the flanges 220 and can be slid in and out via the flanges 220. In some embodiments, the wings 230 comprise telescopic frames, allowing for expansion in size.

In some embodiments, the wings each comprise a series of louvers 231 (e.g., slats, shutters, etc.), e.g., horizontal louvers 231. Louvers are well known to one of ordinary skill in the art. The louvers 231 may each be operatively connected to a motor system, which functions to manipulate the position (e.g., angle) of the louvers 231, for example to accommodate wind speed so as to optimize the efficiency of the system 100. The motor system is operatively connected to a control box, which allows a user to adjust the louvers 231.

Figure 5:
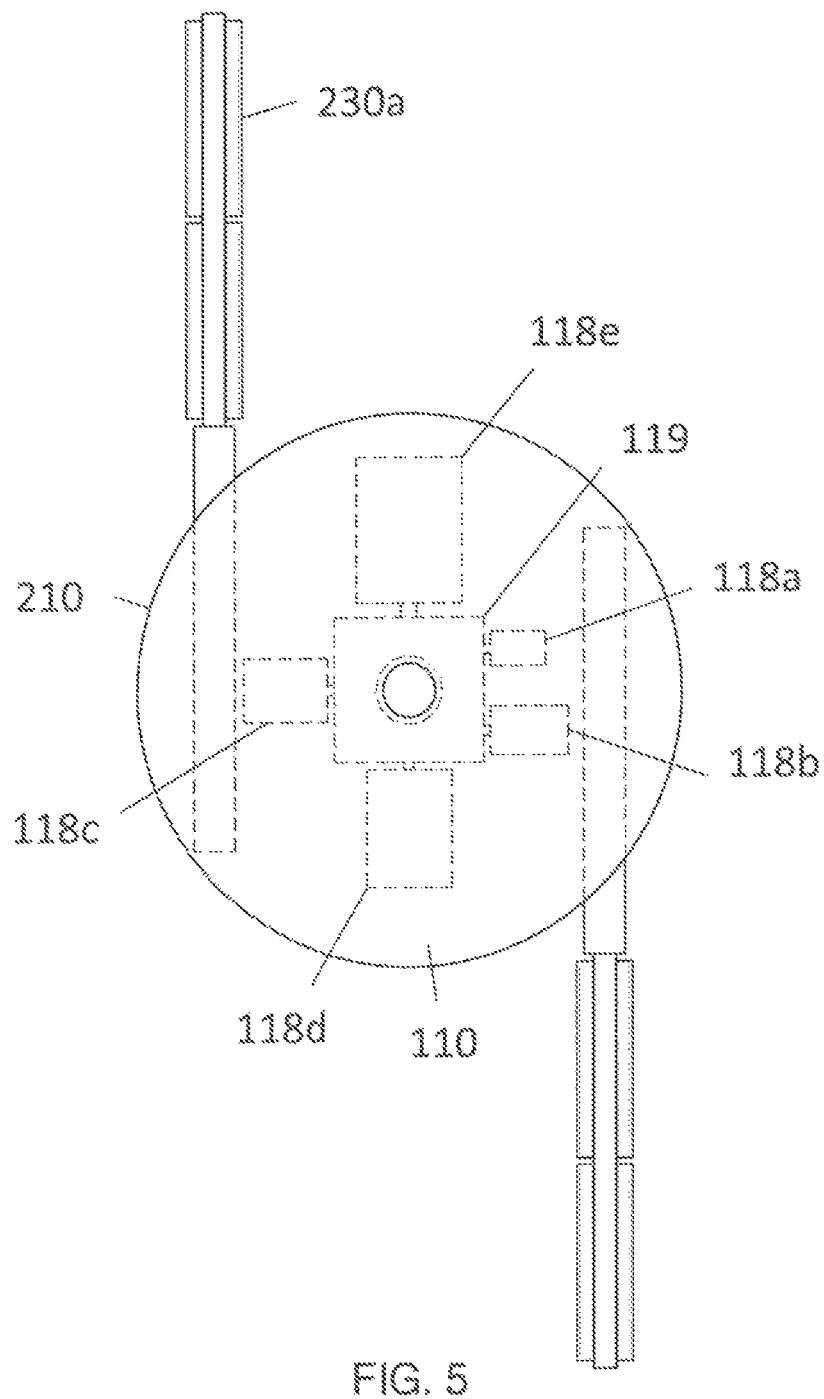
FIG. 5 is a top schematic view of an alternative embodiment of the windmill generator system of the present invention.

In some embodiments, a control system automatically brings additional generators on line as wind speed increases. As shown in FIG. 5, in some embodiments, the system comprises a first generator 118*a*, a second generator 118*b*, a third generator 118*c*, a fourth generator 118*d*, and a fifth generator 118*e*. The generators 118 are operatively connected to the shaft 120 via a clutch system 119.

The disclosures of the following U.S. patents are incorporated in their entirety by reference herein: U.S. Pat. No. 4,015,911; U.S. Pat. No. 7,323,791; U.S. Pat. No. 4,319,141; U.S.

Pat. No. 6,726,439; U.S. Pat. No. 7,396,207; U.S. Pat. No. 7,581,926; U.S. Design Pat. No. D511,495.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A windmill generator system comprising:
   (a) a base 110 that houses a generator 118;
   (b) a shaft 120 extending upwardly from a top surface 115 of the base 110, the shaft 120 is operatively connected to the generator 118 via a clutch system 119;
   (c) a rotor housing 210 rotatably attached atop the shaft 120, the rotor housing 210 is adapted to spin in a first direction and a second direction about the shaft 120, wherein rotation of the rotor housing 210 generates energy for the generator 118;
   (d) a first flange 220*a* extending outwardly from a first side edge of the rotor housing 210, and a second flange 220*b* extending outwardly from a second side edge of the rotor housing; and
   (e) a first wing 230*a* disposed on the first flange 220*a* and a second wing disposed on the second flange 220*b*, each wing 230 extends outwardly a distance away from the rotor housing 210 to harness wind, each wing comprises a series of adjustable louvers 231.

2. The windmill generator system of claim 1, wherein the rotor housing 210 is constructed in a rectangular, circular, hexagonal, or pentagonal shape.

3. The windmill generator system of claim 1 further comprising a third flange 220*c* extending outwardly from a third side edge of the rotor housing 210.

4. The windmill generator system of claim 1 further comprising a fourth flange 220*d* extending outwardly from a fourth side edge of the rotor housing 210.

5. The windmill generator system of claim 3 further comprising a third wing 230*c* disposed on the third flange 220*c*.

6. The windmill generator system of claim 4 further comprising a fourth wing 230*d* disposed on the fourth flange 220*d*.

7. The windmill generator system of claim 1, wherein the wings 230 are expandable in size.

8. The windmill generator system of claim 1 comprising a first generator 118*a*, a second generator 118*b*, a third generator 118*c*, a fourth generator 118*d*, and a fifth generator 118*e* each operatively connected to the shaft 120 via the clutch system 119.

* * * * *